July 30, 1968   A. M. KING   3,395,369
DELAY LINE HAVING A NATURAL COIL SET
Filed April 30, 1965   2 Sheets-Sheet 1

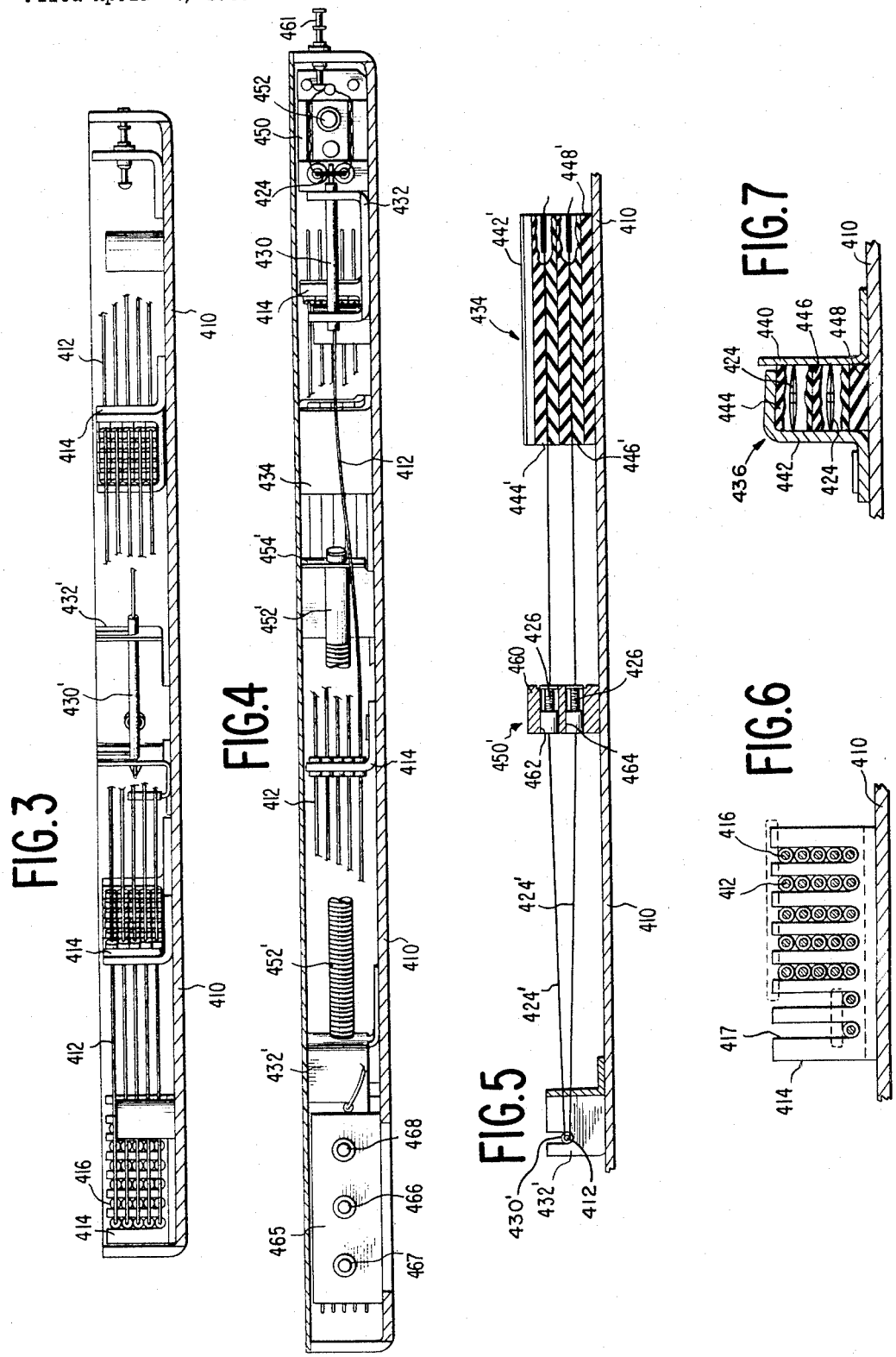

United States Patent Office 3,395,369
Patented July 30, 1968

3,395,369
DELAY LINE HAVING A NATURAL COIL SET
Albert M. King, Fairfield, Conn., assignor to Sperry Rand Corporation, New York, N.Y., a corporation of Delaware
Filed Apr. 30, 1965, Ser. No. 452,274
3 Claims. (Cl. 333—30)

The present invention relates in general to delay lines, and more particularly, to an electroacoustic delay line and method for manufacture thereof capable of providing a construction which is inherently more advantageous than known arrangements of similar construction.

It is known to effect a delay in an electrical pulse by applying such pulse to a device which will successively convert the electrical energy into an acoustic wave of lower velocity traveling through a wire or line and reconvert the wave into electrical energy when the desired delay has been achieved. These devices are based upon the principle that the slow velocity of sound as compared with electricity permits long delays with accoustical media of relatively short length.

One such type of device known to the prior art is the magnetostrictive delay line which converts electrical pulses into accoustical waves within a delay line formed of a length of wire. The waves travel through the wire and are reconverted into electrical pulses at a point along the length thereof corresponding to the desired delay. The conversion of electrical energy into acoustical energy and the subsequent reconversion in these devices is achieved by means of input and output transducer coils which operate on magnetostrictive strips to generate longitudinal stress waves therein. When magnetostrictive material, such as nickel, is magnetized, its dimensions are changed slightly, introducing a sound vibration into the material. Such a sound vibration can be introduced into a strip or wire of nickel by pulsing a small magnetizing or transmitting coil placed around the material at one end. The sound vibration then travels along the strip at a rate determined by the ambient temperature and the composition, with the length of the delay achieved being dependent primarily upon the physical length of the rod or wire through which the acoustical wave is traveling.

The reciprocal of magnetostriction occurs in the rod when it is placed in a magnetic field. This effect in the change in flux in the material when subjected to mechanical strain is utilized at the output end of the delay line to convert the sound vibration back to an electrical signal. This is achieved in a manner substantially identical to the input transducer of the delay line by placing a second receiving coil around the rod or wire and in the field of a biasing magnet.

Since the amount of delay which is achieved by such delay lines is dependent primarily upon the physical length of the delay line, it is necessary in obtaining long delays to wrap, wind, or otherwise arrange the line into a physical shape which will not be of an overly prohibitive size. The most common technique in providing a compact delay line of considerable length is to wind the line into a coil with each of the loops thereof being maintained in physical separation. In this way, by providing a single layer or multiple layer coil, delay line wires of considerable length may be reduced into a construction which is very compact.

However, certain disadvantages result from such coiling of the delay line, since the torsional stress waves in a naturally straight delay line were are subjected to a dispersion which at any point on the wire is inversely proportional to the square of the radius to which the wire is bent at that point. While a certain degree of dispersion is tolerable in most delay line constructions, an appreciable amount of dispersion has a tendency to broaden the pulses in the line, which may if excessive cause a running together of the output pulses to such an extent that they will become indistinguishable from one another unless a considerable spacing is maintained between pulses in the line.

In known devices wherein the delay line consists of a length of naturally straight wire of uniform diameter, it has been found that the wire may be disposed in a curved configuration without subjecting the torsional waves to an appreciable dispersion so long as the extent of curvature is within the elastic limit of the wire. This, of course, materially limits the minimum radius of coiling which can be effected in manufacture of such a delay line thereby limiting the minimum size for a given length of delay line which may be achieved without creating problems with dispersion of the information pulses within the delay line.

The known delay line devices utilizing the coil configuration are also subjected to additional disadvantages relating to the required use of naturally straight wire. This naturally straight wire is coiled in the manner prescribed so as not to exceed the elastic limit and then must be restrained or otherwise fastened in coiled position so that the coil configuration can be maintained. Because of the natural straightness of the wire, considerable forces will be set up at the fastening or clamping means provided for retaining the wire in its coiled position such that considerable attenuation of the acoustic wave traveling through the wire results at each of the fastening or clamping means for the coil, thereby reducing the output level from the delay line.

In eliminating the problems inherent in attenuation, dispersion, and minimum size, the instant invention proposes that the delay line wire, which may be naturally straight or not, be formed into a coiled configuration of desired size and then heat treated until all of the internal stresses in the wire are relieved. The result is a delay line whose natural set conforms to the desired coil configuration thereby eliminating all considerations of stress at the clamping means for the coil, elastic limit, or initial set of the wire used.

It is therefore an object of the instant invention to provide a method for manufacture of an electroacoustical delay line which will materially eliminate the problems associated with known delay lines of a similar construction.

It is a further object of the instant invention to provide a delay line construction which provides for a lower attenuation as compared to known delay lines of a similar type.

It is a further object of the instant invention to provide an electroacoustical delay line and method for the manufacture thereof which provides for increased operating performance without resort to complicated constructional or expensive manufacturing techniques.

It is a still further object of the instant invention to provide an electroacoustical delay line which is capable of being manufactured in accordance with the instant invention from wire having any original configuration or natural bias.

It is still another object of the instant invention to provide an electroacoustical delay line and a method for the manufacture thereof wherein the delay line may be formed of a wire coiled beyond its elastic limit without an appreciable increase in the dispersion loss thereof.

These and other objects, features, and advantages of the present invention will become more obvious from the following description when taken in connection with the accompanying drawing which shows, for purposes of illustration only, an embodiment of the electroacoustical delay line in accordance with the instant invention, and wherein:

FIGURE 3 is a section view of the delay line of FIGURE 1 taken along line 3—3;

FIGURE 4 is a section view of the delay line of FIGURE 1 taken along line 4—4;

FIGURE 5 is a section view of the delay line of FIGURE 1 taken along line 5—5; and FIGURE 6 is a section view of a portion of the delay line of FIGURE 1 taken along line 6—6.

FIGURE 7 is a section view taken along line 7—7 of FIGURE 1.

Since the instant invention relates primarily to the wire coil construction and method for manufacture thereof in an electroacoustic delay line, the particular construction or manufacture of the other necessary elements of such a delay line, such as the input and output transducer assemblies, may take any known form. Therefore, the particular delay line arrangement set forth in FIGURE 1 must be considered exemplary as far as those elements not directly related to the instant invention are concerned.

Figure 1:
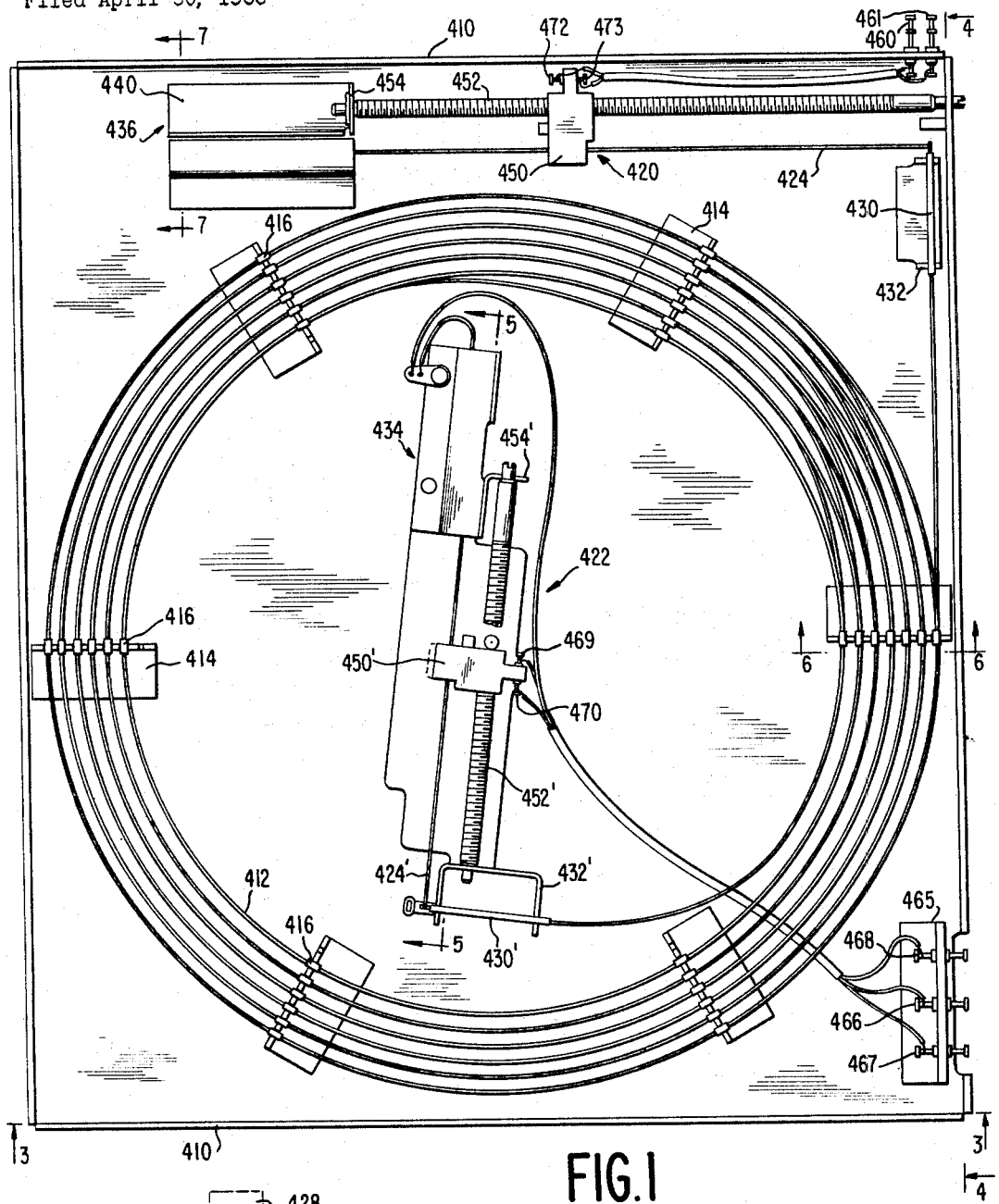
FIGURE 1 is a top plan view of one exemplary delay line construction which may incorporate the features of the instant invention.

Looking now to the figures of the drawings wherein like elements have been identified by similar reference designations, wherever possible, and more particularly to FIGURE 1, the delay line construction disclosed therein is provided with a base or support member 410 upon which all of the elements of the construction are supported. The delay line itself is provided as a continuous coil of wire 412 is positioned in the relative center of and supported upon the support member 410 by a plurality of brackets or clamps 414 which maintain the physical separation between the various loops of the wire and include a plurality of support spacers 416 which also provide for spacing between the various layers of the delay line, as seen more clearly in FIGURES 3 and 6.

The brackets 414 for supporting the delay line coil, as also seen in detail in FIGURE 6, may be provided with a plurality of vertical slots 417 in which the support spacers 416 may be inserted to provide a means for effecting physical separation between the various coils and layers of the delay line wire. The slots 417 are dimensioned such that the spacers 416 fit tightly therein preventing vibration or undesirable movement of the delay line.

The wire 412 is of uniform diameter and made of an alloy capable of low loss propagation of torsional stress waves having a low temperature coefficient of time delay. A material such as nickel-iron-titanium alloy or Ni-Span-C are exemplary of the alloys which may be used for the wire 412.

Figure 2:
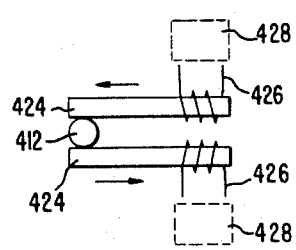
FIGURE 2 is a schematic illustration showing a transducer assembly with its associated delay line and strips.

In order to introduce information into the delay line and extract this energy from the output of the delay line, respectively, there is provided an input transducer 420 and an output transducer 422, each constructed in the well known manner. One form of input and output transducer which is commonly used is illustrated schematically in FIGURE 2. Such a transducer includes a pair of energizing members of magnetostrictive material in the form of a pair of like nickel strips 424 welded to the extreme end of the wire 412 so as to extend tangentially in the same direction from areas of contact at the surface of the wire at two diametrically opposed points thereon such that longitudinal forces on each of the strips 424 in opposite directions will combine to produce a torsional stress in the wire 412 thereby setting up an acoustical wave in the wire which will travel along the length of the wire until it reaches a like transducer at the output end thereof. The longitudinal forces are applied to the strips 424 by means of a pair of coils 426, which may be wound in opposite directions as illustrated in FIGURE 2 or connected so as to provide the direction of current through the coils in opposite directions, thereby effecting a generation of forces in opposite directions in the respective strips 424. The two coils 426 are identical in construction and are located at equal distances along the strips 424 from the wire 412 and are connected so as to be energized simultaneously by the applied pulse.

As already indicated, the output transducer will take a form identical to that of the input transducer with the additional provision of magnets 428 such that the longitudinal stress in the nickel strips 424 will produce a change in the flux of the magnetic field converting the sound vibration back into an electrical signal picked up by the receiving coils on each of the strips 424.

In operation, each input pulse delivered to the coils 426 causes the metal of each strip 424 to contract in the known magnetostrictive manner setting up in the strip a longitudinal stress wave traveling towards the wire. Owing to the like nature of the strips and the coils, the longitudinal stress waves will be of equal intensity reaching the wires synchronously at diametrically opposite points but in the same peripheral direction. The effect is to produce in the wire a torsional stress wave traveling toward the output transducer.

At the output transducer, the arriving torsional wave sets up equal longitudinal stress waves traveling outwardly along two strips attached thereto. Each coil associated with the strips is thereby energized in the manner described above, the energization being synchronous because of the equal distance of the coils from the wire. An output pulse is thus developed.

At the input end of the delay line, the wire 412 is supported by a support members 430 (FIGURES 1 and 4) in a bracket 432 supported by the frame 410. The extreme end of the wire 412 is welded or otherwise fastened, as illustrated in FIGURE 2, to the magnetostrictive strips 424 which are each preferably formed of a lamination of two layers so as to reduce eddy current loses under the transducer coil while still retaining the maximum cross-sectional area of magnetic material within the coil. The strips 424 are supported at the end thereof opposite to the wire 412 by a damping device 436 thereby avoiding reflections in the line which would produce undesirable spurious indications at the output of the delay line. This damping device 436, as seen in FIGURE 7, consists of an L-shaped bracket 440 in conjunction with a second bracket 442, which serve to clamp a pair of damping blocks 444 and 446 against a support block 448, with the support block 448 resting against the frame 410 and the upper damping pad 444 being in direct contact with the upper portion of the bracket 442. Each of the damping blocks 444 and 446 are provided with a central recess into which the magnetostrictive strips 424 are inserted such that the separate strips are mounted one above the other in proper alignment with the ends connected to the wire 412. The damping pads 444 and 446 are made of an electrical insulating material which is sufficiently resilient to absorb the acoustic wave traveling through the magnetostrictive strips. Such pads may, for example, be made from a silicone rubber or other similar material.

The input transducer element 450 (FIGURE 1) is positioned between the bracket 432 and the damping device 436 so as to encompass the magnetostrictive strips 424 and is provided with a position adjusting means in the form of a threaded screw 452 mounted on the one hand in a bracket 454 connected to the bracket 440, and on the other hand to a frame 410. Rotation of the threaded screw 452 thereby effects positional adjustment of the transducer element 450 along the length of the magnetostrictive strips 424 so as to enable adjustment of the energizing coils (not shown) carried by the transducer element 450 length-wise of the magnetostrictive strips.

A similar adjusting means consisting of threaded element 452′ (FIGURES 1 and 4) mounted in bracket 454′ of the output damping arrangement 434 and bracket 432′ serving as the support bracket for the output end of the wire 412, is provided on the output transducer arrangement. The output transducer element 450′ engages with the threaded element 452′ so that adjustment of the position of the output transducer element longitudinally of the magnetostrictive strips 424' can be effected.

The input transducer arrangement 420 and the output transducer arrangement 422 are of essentially identical construction. FIGURE 5 provides a cross-sectional view of the output transducer arrangement 422 (FIGURE 1) including a support bracket 432' for the output end of the wire 412 supported by support member 430', the pair of magnetostrictive strips 424', and the damping arrangement 434 supporting the free end of the strips 424'. The construction of the damping arrangement 434 is identical to the construction of the damping arrangement associated with the input transducer arrangement, as illustrated in FIGURE 7.

As seen in FIGURE 5, the output transducer element 450' consists of a block of insulating material 460 having a pair of horizontally extending bores 462 and 464 within which are accommodated the coils 426 so as to encompass the magnetostrictive strips 424'. The strips 424' pass freely through the coils 426 so as to accommodate movement thereof in response to longitudinal stress passing through the strips.

A pair of input terminals 460 and 461 (FIGURES 1 and 4) are mounted on the support member 410 in proximity to the input transducer arrangement 420 such that input signals may be applied to the transducer element 450. A terminal board 465 also mounted on support 410 carries output terminals 466 and 467 and a ground terminal 468 which is connected to the end of the strips 424 in the damping arrangement 434. The input terminals 460 and 461 are connected to the terminals 472 and 473 on the transducer element 450 and the output terminals 466 and 467 are connected to terminals 469 and 470 on transducer element 450'.

In accordance with prior art devices of the type disclosed and described above, it has been the practice to utilize for the delay line wire a length of "naturally straight" wire coiled in the form of a flat spiral without subjecting the wire to a curvature which might exceed the elastic limit of the wire. However, the specific requirement that "naturally straight" wire be used in the delay line construction results in the creation of undesirable forces at the support brackets for the delay line wire which have a tendency to attenuate the wave traveling through the wire. In addition, the brackets supporting the delay line wire in these devices must not only provide support but also must be sufficiently strong to restrain the wire against the forces created by the natural tendency of the wire to unwind itself.

In overcoming the difficulties inherent in the prior art devices of a similar nature, the instant invention provides a delay line comprising a wire in the form of a flat coil and having a natural set which corresponds to the coil configuration so that in the normal position occupied within the delay line construction each coil and layer of the wire will be in a state of equilibrium. This is accomplished by first winding or wrapping the wire on a drum having a diameter equal to the mean coiling diameter of the wire that is used in the delay line construction and then heat treating the wire until all of the stresses therein are relieved. The result is a coil of wire having a natural set conforming to the desired shape of the final delay line construction having no internal forces which could in any way attenuate the wave traveling through the delay line.

Instead of wrapping or winding the wire about a drum having a diameter equal to the means coiling diameter of the wire, the method in accordance with the invention could also be effectively carried out by winding the wire on a form having dimensions identical to that used in the final delay line construction and then heat treating the wire to meet the desired characteristics. This latter procedure will provide a delay line construction even more closely conforming to the final configuration desired such that all possible internal forces within the delay line wire will be completely eliminated leaving the normally provided clamps 416 with the task of merely spacing and supporting the wire 412.

It is important to note that the method of the instant invention does not require the use of a wire having a particular original or natural set and the winding or coiling of the wire may be carried out without particular regard to the elastic limit of the wire since any dispersion problems which might arise in prior art devices through exceeding of the elastic limit will be eliminated in accordance with the instant invention by the heat treatment step.

Since the curvature of the delay line coil is not limited in accordance with the instant invention by the elastic limit of the wire itself, the minimum size of the delay line coil can be far smaller than the minimum size of delay lines manufactured in accordance with prior art methods. In addition, the elimination of the requirements as to natural straightness of the wire and elastic limit thereof make possible a considerable reduction in manufacturing costs so that not only is the final product superior in performance to those of prior art devices but this product may be manufactured much more inexpensively. It has been found through experimentation that a delay line construction manufactured in accordance with the instant invention to eliminate inherent internal stresses therein will provide an output signal from the delay line which is as much as twice the amplitude as attainable with known conventional devices.

While the instant invention has been described in relation to a particular delay line construction, illustrated in the accompanying drawings, it should be apparent from the above discussion that certain elements and characteristics of the delay line construction, such as, the input and output transducer arrangements, the particular arrangement and size of the delay line including the support members thereof, and the overall arrangement of elements with respect to one another, may be certainly altered without departing from the spirit and scope of the instant invention which relates particularly to the delay line coil and method for the manufacture thereof. Thus, it is to be understood that the above described arrangements are illustrative of the application of the principle of the instant invention and numerous other arrangements may be devised by those skilled in the art without departing from the spirit and scope thereof.

I claim:

1. An electro-acoustical delay line of the magnetostrictive type comprising
   a wire whose natural set is in the form of a coil,
   means for supporting said coil in a configuration conforming to the natural set of said wire,
   input transducer means coupled to one end of said wire,
   output transducer means coupled to the other end of said wire, and
   means for energizing said input transducer and extracting energy from said output transducer means.

2. An electro-acoustical delay line of the magnetostrictive type comprising
   a wire whose natural set is in the form of a coil,
   means for supporting said coil in a configuration conforming to the natural set of said wire,
   input transducer means coupled to one end of said wire,
   output transducer means coupled to the other end of said wire, and
   means for energizing said input transducer and extracting energy from said output transducer means,
   said wire being formed of a naturally straight wire heat treated so as to take a natural set in the form of a multiloop coil.

3. In an electro-acoustical delay line of the magnetostrictive type having input and output transducer means and means for energizing said input transducer means for energizing said input transducer means and extracting energy from said output transducer means, the improvement essentially consisting of a wire having a natural set in the form of a coil and means for supporting said coil in a configuration conforming to the natural set of said wire.

No references cited.

ROY LAKE, *Primary Examiner.*

DARWIN R. HOSTETTER, *Assistant Examiner.*